(12) United States Patent
McMahon et al.

(10) Patent No.: US 9,386,063 B2
(45) Date of Patent: Jul. 5, 2016

(54) CONTENT STORAGE AND IDENTIFICATION

(75) Inventors: Michael D. McMahon, Centennial, CO (US); Danial E. Holden, Englewood, CO (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 105 days.

(21) Appl. No.: 13/235,987

(22) Filed: Sep. 19, 2011

(65) Prior Publication Data

US 2013/0073673 A1    Mar. 21, 2013

(51) Int. Cl.
| | |
|---|---|
| *G06F 15/16* | (2006.01) |
| *H04L 29/06* | (2006.01) |
| *H04N 21/433* | (2011.01) |
| *H04N 21/436* | (2011.01) |
| *H04N 21/6587* | (2011.01) |
| *H04L 29/08* | (2006.01) |

(52) U.S. Cl.
CPC .......... *H04L 65/602* (2013.01); *H04L 67/1097* (2013.01); *H04N 21/4333* (2013.01); *H04N 21/43615* (2013.01); *H04N 21/6587* (2013.01)

(58) Field of Classification Search
CPC ..... H04L 65/60; H04L 65/601; H04L 65/605; H04L 65/60503; H04L 65/4069
USPC .................................................. 709/217, 231
See application file for complete search history.

(56) References Cited

U.S. PATENT DOCUMENTS

| | | | |
|---|---|---|---|
| 5,996,015 A | 11/1999 | Day et al. | |
| 7,103,906 B1 | 9/2006 | Katz et al. | |
| 7,281,034 B1 | 10/2007 | Eyal | |
| 7,685,459 B1 * | 3/2010 | De Spiegeleer et al. | ..... 714/6.12 |
| 8,370,396 B2 * | 2/2013 | Blaxland et al. | .............. 707/800 |
| 8,473,993 B2 | 6/2013 | Athias | |
| 8,813,151 B2 | 8/2014 | Athias | |
| 9,253,548 B2 * | 2/2016 | Swaminathan | .. H04N 21/64738 |
| 2002/0083468 A1 * | 6/2002 | Dudkiewicz | .................. 725/133 |
| 2002/0104099 A1 | 8/2002 | Novak | |
| 2002/0124182 A1 * | 9/2002 | Bacso et al. | .................. 713/200 |
| 2004/0117842 A1 | 6/2004 | Karaoguz et al. | |
| 2004/0236568 A1 | 11/2004 | Guillen et al. | |
| 2005/0015464 A1 | 1/2005 | Young | |
| 2005/0022237 A1 | 1/2005 | Nomura | |
| 2005/0028194 A1 * | 2/2005 | Elenbaas | ........... G06F 17/30787 725/32 |

(Continued)

OTHER PUBLICATIONS

Extended European Search Report—EP 12184385.8—Mailing Date: Sep. 4, 2013.

(Continued)

*Primary Examiner* — Douglas Blair
(74) *Attorney, Agent, or Firm* — Banner & Witcoff, Ltd.

(57) ABSTRACT

Content intended for delivery to one or more consuming users may be recorded by a content distribution system. The recording or archival of the content may allow users to retrieve the content at a later time without providing specific instructions to record the content. Storage of the content may include retrieving programming information describing the content and storing the information in association with the content. In one or more arrangements, descriptive data for content may be generated based on user feedback. Additionally or alternatively, content storage may include fragmentation of the content into a number of segments or segments of a specified size. Content may further be paused and resumed between multiple devices, taking into account the capabilities and compatibilities of the devices and a network through which the content is to be delivered.

16 Claims, 7 Drawing Sheets

(56) References Cited

U.S. PATENT DOCUMENTS

| | | |
|---|---|---|
| 2005/0240494 A1 | 10/2005 | Cue et al. |
| 2006/0090186 A1 | 4/2006 | Santangelo et al. |
| 2006/0173916 A1* | 8/2006 | Verbeck Sibley . G06F 17/30035 |
| 2007/0094690 A1 | 4/2007 | Rodriguez et al. |
| 2008/0010342 A1 | 1/2008 | Gebhardt et al. |
| 2008/0060001 A1 | 3/2008 | Logan et al. |
| 2008/0092168 A1 | 4/2008 | Logan et al. |
| 2008/0147711 A1 | 6/2008 | Spiegelman et al. |
| 2009/0063976 A1 | 3/2009 | Bull et al. |
| 2009/0165031 A1 | 6/2009 | Li et al. |
| 2009/0172752 A1 | 7/2009 | Lopatic |
| 2009/0204663 A1* | 8/2009 | Patwari ................. 709/203 |
| 2009/0228919 A1 | 9/2009 | Zott et al. |
| 2009/0265742 A1 | 10/2009 | Schwartz et al. |
| 2009/0313295 A1* | 12/2009 | Blaxland et al. ......... 707/103 R |
| 2010/0100899 A1* | 4/2010 | Bradbury et al. ............ 725/29 |
| 2010/0125882 A1 | 5/2010 | Athias |
| 2010/0325303 A1* | 12/2010 | Wang et al. ................. 709/231 |
| 2011/0077046 A1* | 3/2011 | Durand et al. ............ 455/550.1 |
| 2011/0218998 A1 | 9/2011 | Mercer et al. |
| 2012/0020647 A1* | 1/2012 | Vogel .......................... 386/251 |
| 2012/0069131 A1* | 3/2012 | Abelow ..................... 348/14.01 |
| 2012/0114312 A1* | 5/2012 | Sutherland et al. .......... 386/296 |
| 2012/0117595 A1* | 5/2012 | Svendsen et al. .............. 725/39 |
| 2012/0117598 A1* | 5/2012 | Pons et al. ..................... 725/40 |
| 2012/0233138 A1* | 9/2012 | Nijim et al. .................. 707/701 |
| 2012/0284745 A1 | 11/2012 | Strong |
| 2013/0138677 A1* | 5/2013 | Blaxland et al. .............. 707/758 |
| 2013/0227621 A1* | 8/2013 | Barton ............................ 725/92 |
| 2013/0239145 A1 | 9/2013 | Broome et al. |
| 2013/0347036 A1 | 12/2013 | Athias |
| 2014/0006478 A1* | 1/2014 | Eguchi ................. H04L 65/605 709/203 |
| 2014/0101329 A1* | 4/2014 | Brueck ............. H04L 29/06027 709/231 |

OTHER PUBLICATIONS

Canadian Office Action—CA Appl. 2,683,178—dated Nov. 17, 2015.

Mar. 3, 2011 Office Action issued in European Patent Application No. 09173259.4.

Kawamoto et al, "On 1st Birthday, iTunes Unwraps New Features," Jan. 1, 2004, XP002996197 URL: http://news.com.com/2103-1027_3-5201599.html?tag=st.util.pring>.

Apr. 27, 2010 Search Report issued in European Application No. 09 17 3259.

* cited by examiner

CONTENT STORAGE AND IDENTIFICATION

TECHNICAL FIELD

Aspects of the disclosure relate to storage and identification of content. Some aspects relate to the automatic recordation, fragmentation and/or description of content such as to provide temporal indexing and retrieval of the content.

BACKGROUND

More and more consumers are relying on delayed viewing to catch shows, programs and other content that they might not be able to see, hear or otherwise consume as originally scheduled. In some cases, as identified in this disclosure, users may miss shows or programs if they are not available to setup recording of the show or if they are not aware of the scheduling and/or existence of the show or program.

The disclosure also identifies cases where the users might not be able to migrate between devices, networks and the like.

BRIEF SUMMARY

The following presents a simplified summary of the disclosure in order to provide a basic understanding of some aspects. It is not intended to identify key or critical elements of the disclosure or to delineate the scope thereof. The following summary merely presents some concepts of the disclosure in a simplified form as a prelude to the more detailed description provided below.

According to one or more aspects, a content distribution system may receive content from a content provider and may record the content without user interaction or instruction. For example, the content may be recorded without receiving corresponding instructions from an end-user (e.g., a viewing or consuming user). The recording or storage may be carried out concurrently with, prior to or after delivery of the content to a user device (e.g., at a scheduled show time). In one or more arrangements, the content distribution system may be located remotely from the user device and/or the content provider. Additionally, the recording of content may be performed based on parameters and conditions specified by the content distributor or the content provider or other entities other than end-users. For example, a content distributor may indicate that movies are not to be recorded while all sporting events under 4 hours are to be recorded. In another example, a content provider may indicate that only re-runs are to be recorded while first airings are not to be recorded. Various other parameters and recording conditions may be defined as desired or needed.

According to another aspect, content recordation may include fragmentation of the content. In a particular example, a content item may be fragmented into multiple individual segments or portions and stored as such. Each segment or portion may be of a predefined size (e.g., time or data size) and may, in one or more arrangements, be stored as a separate segment file. The separate segment files may also be individually retrievable by a user or system. In other examples, the content item may be fragmented according to a desired number of segments. Alternatively or additionally, multiple versions of the content item may be stored. Each version may correspond to a different video, audio or text format, device capability, resolution, language, screen size and the like.

According to yet another aspect, descriptive data for the content item or segments or fragments thereof may be retrieved and stored in association with the content item or the content item segments. For example, a synopsis of a movie may be stored as metadata with a content item. In another example, scoring information may be stored as metadata for a sporting event. Descriptive data may be retrieved from a variety of sources including websites, Internet or other network, databases, electronic programming guides and the like. Descriptive data may also be stored at the segment-level and thus, a first content item segment may include a first set of descriptive data while a second content item segment includes a second set of descriptive data different from the first set.

In still another aspect, user commentary, ratings and other feedback may be stored as descriptive data in association with a content item or segments thereof. Thus, a content item and portions of the content item may be more specifically described using user feedback. In one example, a user may identify the start and end times for a particular event (e.g., an exciting play in a sporting event, a climactic scene in a movie, a story in a news program). The content distribution system may then store appropriate descriptive data (e.g., user labels, titles or description) for the segments falling within the start and end times. Additionally or alternatively, the corresponding segments (or copies thereof) may be stored separately as an individual clip or content item.

According to another aspect, a content distribution system may allow users to seamlessly transition between devices while viewing, listening to or reading content. The content distribution system may determine whether the device on which content is to be resumed is the same device or a different device. If a different device, the content distribution system may then select a version of the content that is compatible with the new device. In either case, the content distribution system may further determine a network through which the content is to be delivered and format the content in accordance with a transmission protocol suitable for the network.

The details of these and other embodiments of the present disclosure are set forth in the accompanying drawings and the description below. Other features and advantages of the invention will be apparent from the description and drawings, and from the claims.

BRIEF DESCRIPTION OF THE DRAWINGS

The present disclosure is illustrated by way of example and not limited in the accompanying figures in which like reference numerals indicate similar elements and in which.

DETAILED DESCRIPTION

In the following description of the various embodiments, reference is made to the accompanying drawings, which form a part hereof, and in which is shown by way of illustration various embodiments in which the invention may be practiced. For example, aspects described herein provide a content recording and delivery system through which content may be automatically recorded by a content provider to a storage device. Additionally, the system may perform the automatic recording without user instruction or specification from user devices. This provides the user with the ability to retrieve content after the content has already been delivered (e.g., broadcast, streamed, unicast, multicast or otherwise transmitted) according to a predefined schedule and without having to request recordation ahead of time. It is to be understood that other embodiments may be utilized and structural and functional modifications may be made without departing from the scope of the present disclosure.

Figure 1:
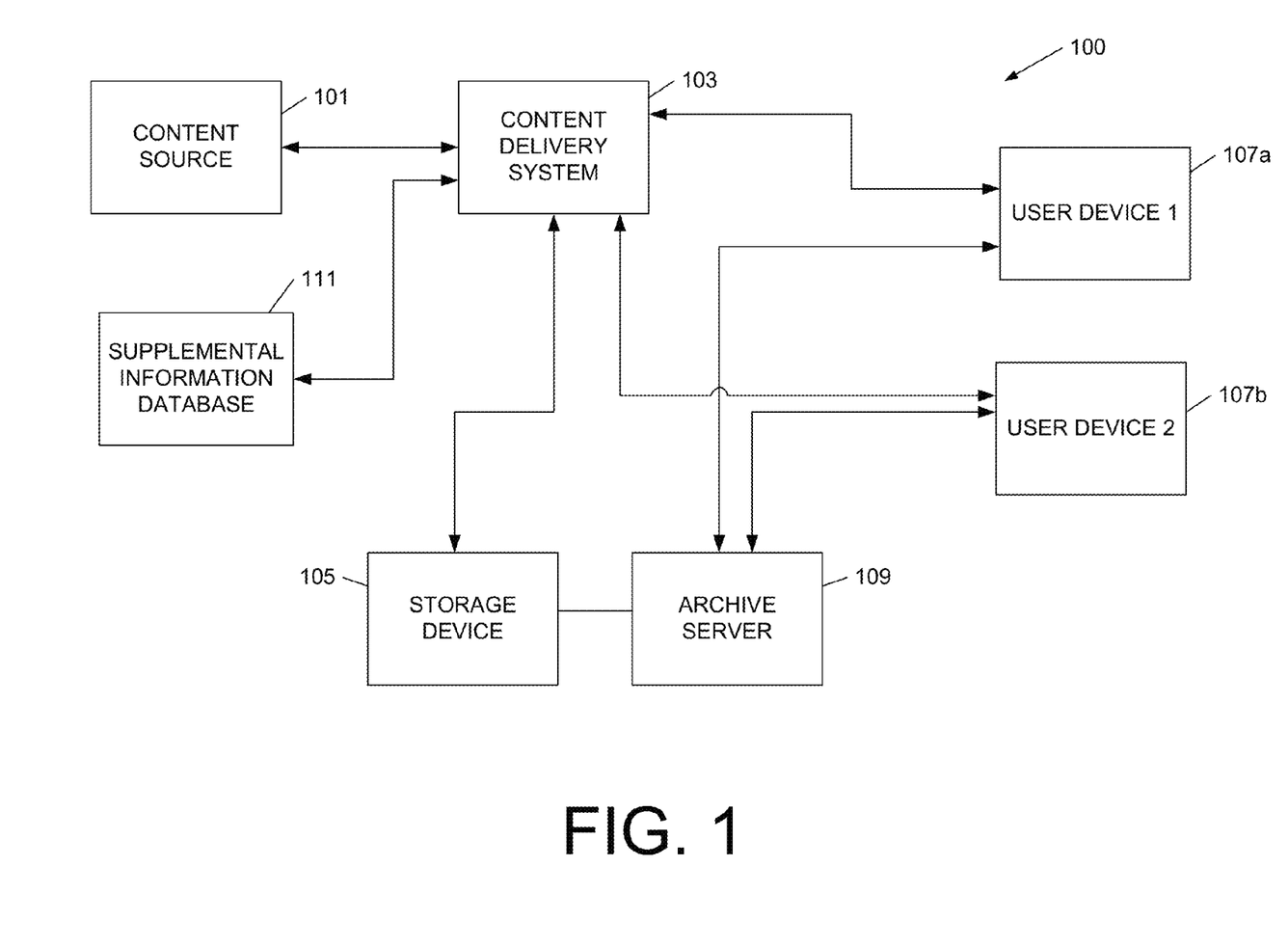
FIG. 1 illustrates an example network environment according to one or more aspects described herein.

FIG. 1 illustrates a network environment 100 that may be used in connection with one or more aspects described herein. Network environment 100 includes a content source 101, a content delivery system 103, a storage device 105 and user devices 107a and 107b. During content delivery, the content source 101, such as a television station, a network content server (e.g., YouTube), web servers providing streaming content or any other content providers, provides content to the content delivery system 103 for distribution to one or more users (e.g., subscriber, member, viewer, client, customer, service purchaser, etc.) and user devices 107a and 107b, for example. Content may include data, audio, video, text, images, haptic feedback signals and/or combinations thereof. User devices 107a and 107b may be user premises devices and portable user devices such as a content rendering device (e.g., a display, television, monitor, mobile telecommunication devices, smartphones, gaming devices, audio playback device, radio, personal computer, media player, digital video recorder, etc.), a local storage device, a receiver and/or combinations thereof. A content rendering device may be integral with or external to the user devices 107a and 107b. In one or more arrangements, user devices 107a and 107b and/or users thereof may be required to register with the content delivery system 103 and/or content source 101. In an alternate example, registration might not be required; instead, the user may simply specify a content location or address to access and/or receive desired content items.

Upon receipt of content from the content source 101, the content delivery system 103 may be configured to distribute the content to one or more user devices 107a and 107b. For example, the content delivery system 103 may deliver content to one or more requesting users through associated user devices 107a and 107b. In other examples, the content may be delivered to all user devices 107a and 107b associated with the content delivery system 103, or to user devices 107a and 107b selected by the content delivery system 103 based on parameters specified by the content source 101, a viewer/user and/or a provider operating the content delivery system 103.

Content delivery system 103 may transmit the content using a variety of networks, network protocols, transmission protocols, and the like. In one example, content delivery system 103 may deliver content through a wide area network (WAN) such as the Internet using IP protocol. In other examples, content may be delivered through MPEG transport streams. Content delivery system 103 may be configured to transmit content over wireless and/or wired networks such as Wi-Fi networks, cellular networks, coaxial networks, fiber optic networks, hybrid fiber-optic coax (HFC) networks, WANs, local area networks (LANs) and the like and/or combinations thereof.

In various examples, content delivery system 103 may be configured to deliver content based on a predefined schedule that may, in some arrangements, be provided to users in the form of an electronic programming guide (EPG). In some examples, content may include live programming (e.g., sporting events, news broadcasts). Other types of schedules may also be used including printed guides, schedules provided through a separate application or app (e.g., on a user's mobile communication device), web-based programming schedules and the like. If a user is unaware or not available to watch or request recording of the content prior to the scheduled delivery, the user might not be able to view the content until or unless delivery of that content is scheduled again for a later time. In order to provide the user with the ability to access content regardless of whether the user provided instructions to record the content prior to the scheduled delivery, portions of components of the content delivery system 103 is further configured to record content with or without user instruction or specifications. In one configuration, the content delivery system 103 may be configured to record content without instructions from any devices configured to receive content from content delivery system 103 and/or users thereof. For example, the content delivery system 103 may record all content that is delivered to user devices 107 so that they are available for future delivery/retrieval. In another example, content delivery system 103 (or any of its portions or components, as to be understood herein) may automatically record content based on non-viewer/end-user specified parameters, such as service/content provider or operator defined parameters (e.g., specifications, triggers, etc.). Storage may be performed concurrently with the delivery of the content to user devices.

Content may be recorded to various storage devices including network storage device 105. The network storage device 105 may be independent from any specific subscriber or user and may, instead, reside at a content or service provider location. Content delivery system 103 may also be configured to associate the recorded content with content metadata and/or attribute information including, for example, a synopsis of the content, actors in a movie or show, teams in a sporting event, date and subject of a news broadcast, station or channel through which the content was delivered, a time of the content delivery, format of the content (e.g., high definition (HD) vs. standard definition (SD), 1080i, 1080p, 720p) etc. Descriptive information may be retrieved from a separate or integral database, such as supplemental information database 111, and associated with corresponding content. The content may be offered for consumption (e.g., viewing, listening, etc.) through a server, such as archive server 109. Archive server 109 may be a part of or physically separate from content delivery system 103 and may be located locally to or remotely from content delivery system 103. In one example, a user device such as device 107a may contact server 109 upon receipt of user instructions to access recorded or archived content. Instructions and/or the delivery of recorded or archived content may be transmitted via any communication link, directly or through one or more intermediary devices such as routers, gateway devices, localized servers, Internet service providers (ISPs) and the like.

Figure 2:
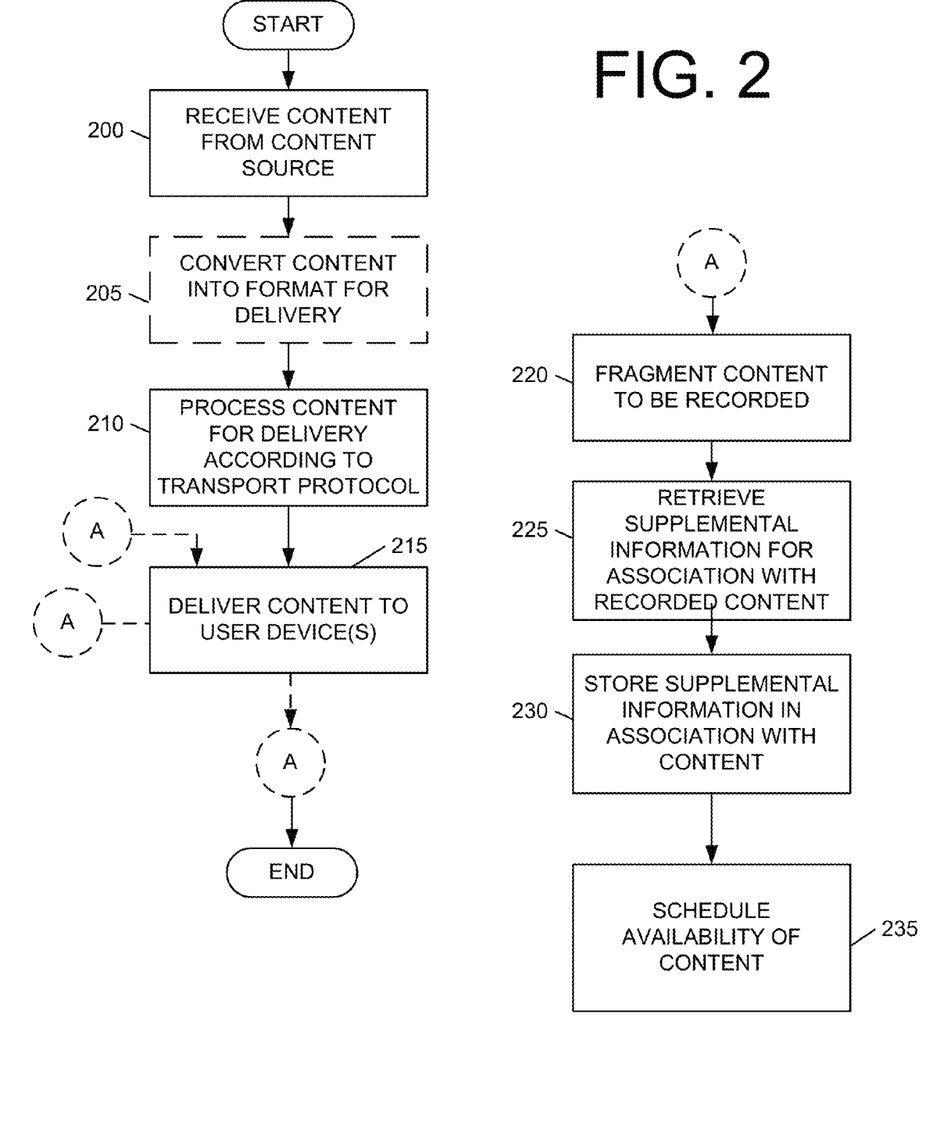
FIG. 2 is a flowchart illustrating an example method for recording or storing content according to one or more aspects described herein.

FIG. 2 is a flowchart illustrating an example method for automatically storing or archiving content received, for example, content from a content source, from individual users, entities, institutions, organizations, etc. In step 200, a content delivery system (e.g., system 103 of FIG. 1) receives content from a content provider. The content may include data, audio, video, text, haptic feedback signals and the like, and may be provided from a variety of sources, as discussed above, such as content providers, television broadcast companies, Internet content providers, other users, user-generated content sites and the like. In step 205, the content delivery system optionally converts the content into an appropriate content format for delivery to one or more user devices (e.g., devices at premises, remote devices, mobile devices, etc.) for consumption by a user, such as at a user's location such as a home, office or vehicle. Converting the content may include encoding or transcoding the content according to a content format such as MPEG4, FLASH, or any other format, and/or adapting the content to a predefined bitrate and/or resolution. In some arrangements, multiple versions of the content may be created to serve differing user devices and device capabilities (e.g., SD vs. HD display devices, mobile display devices, HD vs. SD radio, SMS vs. MMS etc.). In step 210, the content delivery system may optionally further process the content for delivery according to one or more transport protocols such as MPEG Transport Streams (TS), IP datastreams, mobile content delivery protocols etc. The content may be processed according to multiple different transport protocols to communicate with different types of networks and devices (e.g., set-top boxes may receive MPEG TS transmissions while IP-enabled devices may be configured to receive IP datastreams). In step 215, the content may subsequently be delivered to one or more user devices through an appropriate network or combination of networks (e.g., cellular networks, the Internet or other WANs, LANs, etc.). In some arrangements, the content may be maintained or stored by the content delivery system until a scheduled delivery time (e.g., a broadcast or transmission time defined by a schedule).

Prior to, concurrently with and/or after delivery of the content to the user devices, the content delivery system may further record or otherwise store the content into one or more network storage devices or archives (e.g., storage device 105 of FIG. 1). The recording or storage process may include, for example, an initial fragmentation step as illustrated in step 220. Fragmentation of the content item may allow for more specific, or fine grain, searching and navigation of the content or particular content item. For example, if a user wishes to identify only portions of the content that include a home run during a baseball game, the content delivery system or a server may identify and provide access to or deliver only those content fragments or segments corresponding to a home run event. Segments, fragments and portions may all describe a subset of an entire content item and are used interchangeably throughout this description. The segments may be of a predefined size such as 2 seconds, 4 seconds, 1 second, 10 seconds, 30 seconds, 1 minute or the like. In some arrangements, the segment size may depend on the content type and/or size. In one example, audio may be fragmented into 3 second portions while video may be fragmented into 10 second portions. In another example, content having a length of 30 seconds or less may be fragmented into 1 second portions while content that is 31 seconds to 1 minute in length may be fragmented into 2 second portions. In yet another example, the size of the segments may be defined based on storage/data size. In one aspect, segments may be limited to 50 MB each. Accordingly, even though an HD video and a SD video of the same content are the same length, in an aspect, the HD video may be fragmented into more pieces or portions than the SD video since the HD video will generally include more data and thus be of greater data size.

In step 225, the content delivery system may further retrieve supplemental information, such as programming data, for association (e.g., storage) with the content (or the individual segments thereof). The information may include a variety of information related to the content including names of actors, actresses, speakers, singers, artists, authors, date of creation, date of first broadcast/delivery, awards won, synopsis or summary, definition level (HD vs. SD), popularity, viewer comments and ratings (e.g., from social media entities) and the like. As noted previously, the programming data may be retrieved from a variety of sources such as the Internet or other networks, a content provider, a content distributor database, individual users or groups, an electronic programming guide and/or combinations thereof. In step 230, the content delivery system may store the supplemental information (e.g., programming data) in association with the content in a storage device (e.g., network storage device 105 of FIG. 1). In one example, the programming data may be stored as metadata for the content file or each content segment file. In another example, each content file or content segment file may include a reference (e.g., a link) to supplemental information, such as programming data, stored in a database or accessible elsewhere. Upon retrieving the content, e.g., for delivery, to a requesting device and/or user, the corresponding information may also be retrieved based on the stored link or other reference.

In step 235, the content delivery system may optionally schedule the availability of the recorded content to consumers (e.g., viewers, readers, listeners) and other users. Some content, for instance, may be restricted from on-demand or at-will type access until a certain date or amount of time has lapsed. For example, content creator or providers might not allow on-demand access to content until 2 weeks after the original showing, delivery or airing of the content. Such availability restrictions may be defined by the content provider, by the content delivery service and the like. In some arrangements, recorded content might only be made available for a limited amount of time. Alternatively, recorded content may be available to users indefinitely.

Recording and/or storage of content without end user/viewer instructions is also advantageous in that such a feature allows the user to pause content without requiring localized storage. Accordingly, even if a user does not own or have access to a content recording device, the user may still use content control functionalities such as pause, rewind, fast forward and the like. In another example, if the user's home content recording device is full, pre-occupied (e.g., by other recordings) or otherwise unavailable, the user may still use such content control functionalities.

Another example feature of the content recording system described herein includes selective recording by the content access distribution system. That is, instead of recording all received content automatically, the content recording system may selectively record content based on various rules and parameters (e.g., copyright restrictions, cost, time, projected or actual user interest, etc.). Recording rules and parameters may be specified by the content distribution service, a content creator or provider, a content distributor, an end-user and/or combinations thereof. In one example, a content distribution system might only record content of particular types, provided on specified channels, or from particular content providers. In another example, a content distribution system might only record content of specified categories or types (e.g., television shows and sporting events but not movies). In still other examples, selective recording may be based on a length or duration of the content item, a rating of the content (e.g., an MPAA rating, ESRB rating), the source (e.g., particular network such as the Internet, specific broadcasters such as NBC, CBS, etc., free vs. paid providers, etc.), time of day and/or combinations thereof.

In some arrangements, in addition to merging programming data or other information with content segments, the system may further cross-reference and index the content segments against other content repositories such as HULU, NETFLIX, ITUNES, AMAZON, YOUTUBE and the like. For example, a content segment may be associated with metadata that identifies the content based on an identifier. These identifiers may be standardized across multiple repositories and thus, a user may be provided with a choice of on-line providers using the content and/or segment identifier by querying the other repositories using the identifiers. The identifier may be content specific or segment specific. In some examples, the overall content may correspond to a first identifier while each individual segment may correspond to their own unique identifiers.

Another feature of cross-referencing between repositories includes the ability to identify specific content portions of interest in the external repositories based on the indexing provided by the content recording system. For example, external repositories might not include metadata (e.g., timecodes, descriptions) having a granularity as fine as that which may be provided by the content recording system as a content segment level. Accordingly, using the content segment level metadata such as timecodes provided by the content recording system, a system may access relevant portions of content from the external repositories without requiring a user to manually search through the content of the external repository. Additionally or alternatively, alternative formats, languages, resolutions and the like may be identified from the external repositories based on the content identifier(s).

Figure 3:
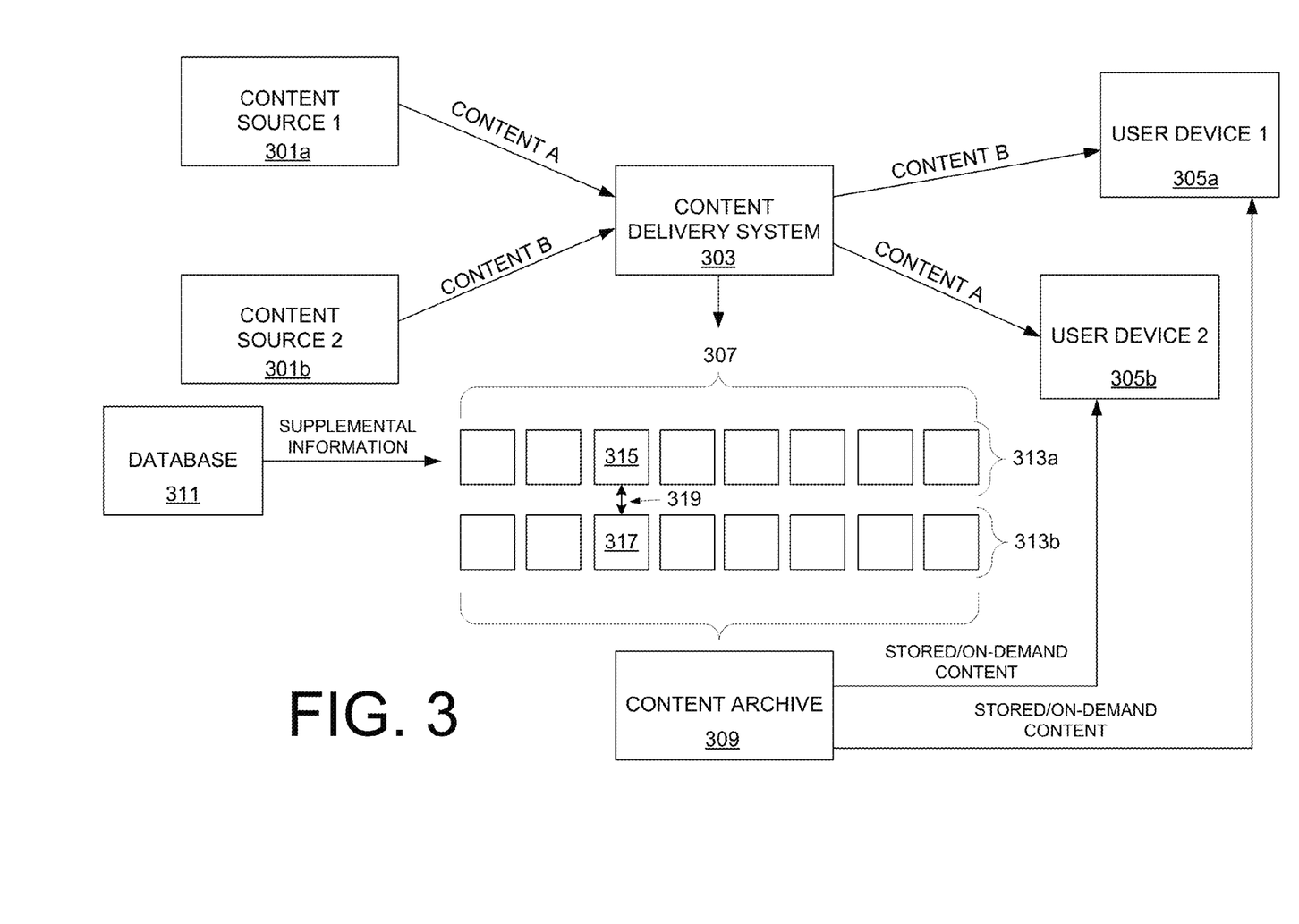
FIG. 3 illustrates an example data flow in which content is fragmented according to one or more aspects described herein.

FIG. 3 illustrates an example architecture and data flow in which content is delivered and archived according to one or more aspects described herein. Varying types and formats of content may be received from a variety of sources including content sources 301a and 301b. The content may be streamed from content sources 301a, 301b or may be delivered (e.g., downloaded) as a whole to or accessed by content delivery system 303. Upon receipt of the content, the content delivery system 303 may determine whether to record or otherwise store the content in addition to delivering the content to one or more user devices 305a and 305b according to a specified distribution schedule. If the content is to be stored, the content delivery system 303 may subsequently fragment the content into one or more segments 307 for storage in archive 309, or another device or location. Metadata and/or descriptive information may be stored in association with each segment 307. In one example, if commercials are inserted at known times and for known durations during a program, the content delivery system 303 may further categorize or group the segment 307 into commercial segments and non-commercial segments. Other descriptive or supplemental information may be retrieved from one or more sources such as database 311.

As noted herein, content delivery system 303 may, in some arrangements, generate or cause to be generated multiple versions, e.g., 313a and 313b, of content for different receiving devices, users, etc. In one example, each of the multiple versions may be different from one another. In other examples, one or more of the multiple versions may be the same as another version. Accordingly, database 311 and/or archive 309 may further store references between the versions. In one example, database 311 and/or archive 309 may store links or references between corresponding segments of the different versions of the recorded content (e.g., link 319 between segment 315 and segment 317 of a first version and a second version of the recorded content, respectively). In a particular example, an HD version of the recorded content may comprise twice as many segments as the SD version of the same content. Accordingly, if a user wishes to switch from SD to HD during at a particular point in the content, a reference to a corresponding HD segment or fragment would allow for quick and seamless retrieval and delivery.

Descriptions of segments or fragments of the content (or the content as a whole) may also be generated based on user interaction and feedback. In one example, content distribution personnel may manually mark and tag content and/or segments thereof to identify particular events (e.g., touchdowns, goals, slam dunks, gunfight scenes, etc.), identify content sub-portions (e.g., commercials), describe scenes, identify actors and the like. In other examples, users or social networks watching the content may also provide feedback and descriptive information to supplement predefined programming data. The additional description and identification data may then be additionally stored with the content item or a specific segment or segments thereof and used to allow for more fine grain searching during later retrieval (e.g., from a content archive). For instance, a user retrieving a recorded football game may be able to search for and watch only touchdown segments (e.g., drives ending in a touchdown).

Figure 4:
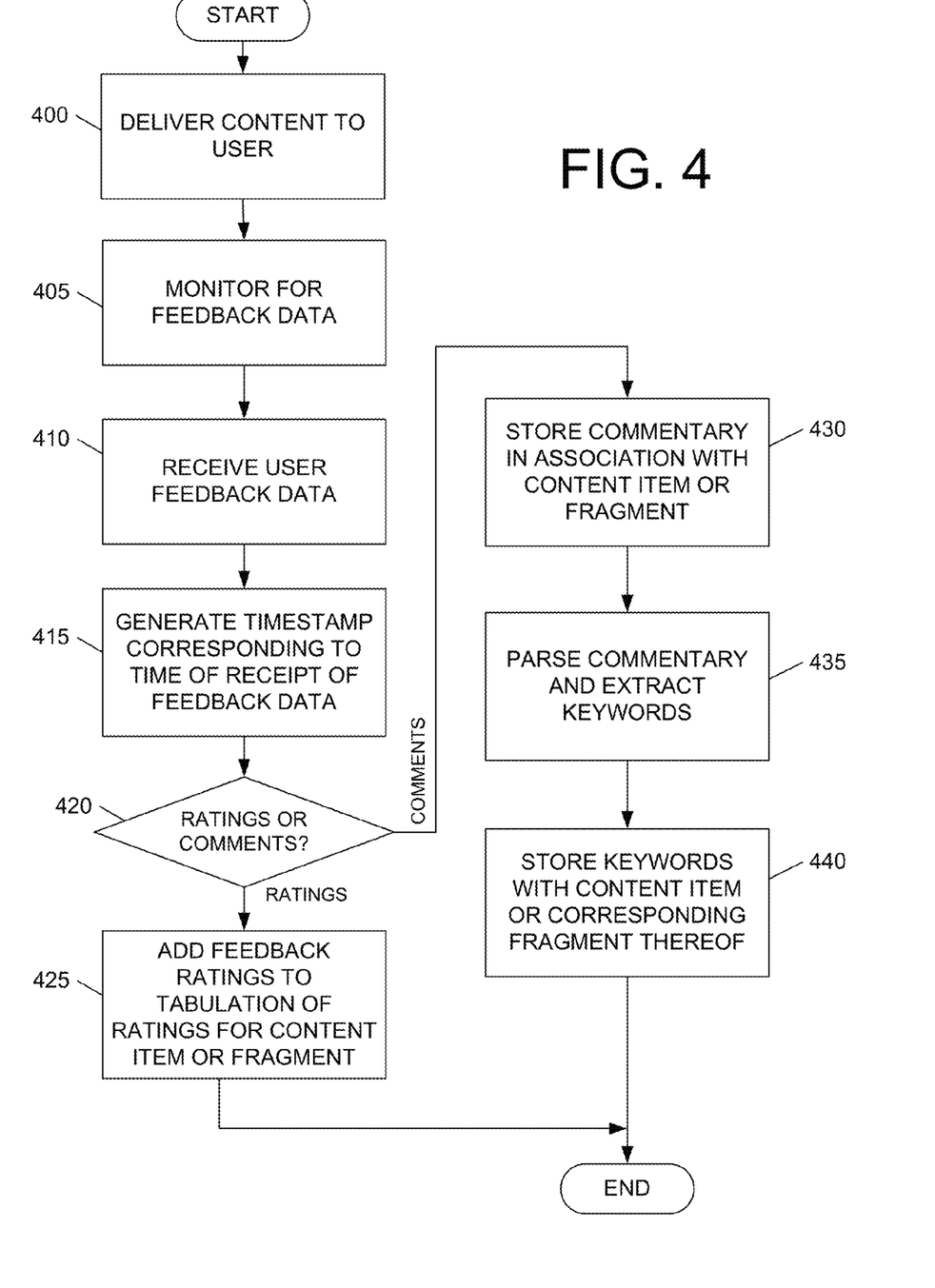
FIG. 4 is a flowchart illustrating an example method for obtaining descriptive data in association with content according to one or more aspects described herein.

FIG. 4 is a flowchart illustrating an example method for obtaining content description data and storing such data in association with a content item or segment of content. In step 400, a content distribution system may begin delivering a content item to a user through, for example, a user device. As the content is being delivered, the content distribution system may further monitor for feedback data received from the user in step 405. Users may provide feedback using a variety of devices including remote controls by pressing a predefined button for rating a content item or selecting a feedback option (e.g., indicating a favorable opinion versus unfavorable opinion, identifying a significant portion of the content item, marking inappropriate content portions, etc.). In other examples, users may operate an alphanumeric keyboard (physical or virtual), speak into a microphone, use gestures, or otherwise enter comments and/or descriptions relating to the content item or a segment of the content. The comments, indicators and/or other user generated feedback data may then be transmitted, e.g., through the user device (e.g., a display, a content rendering device, a content receiving device, etc.), to the content distribution system. Accordingly, content distribution system may detect and receive user feedback data in step 410 at various points during content delivery.

Upon receipt of the user feedback, the content distribution system may generate a timestamp associated with the time at which the user feedback was received in step 415. In some arrangements, the content distribution system may use a timestamp generated by the user device upon the user entering their feedback. The timestamp may include a time of day, time of week, date, content segment identifier (e.g., if the content item has already been fragmented), a lapsed running time of the content and/or combinations thereof. In step 420, the content distribution system may determine whether the feedback corresponds to a rating or if the feedback corresponds to user comments. Ratings may include a user-specified value based on a predefined numerical, alphabetical, alphanumerical, symbolic scale such as 1-5, A-E, 1-5 stars, thumbs up or thumbs down, etc.

If the user feedback corresponds to ratings, the feedback may be added to a running tabulation of ratings in step 425. Ratings may be registered (e.g., specified or stored) for specific segments of the content or for the content as a whole. In one example, users may be able to choose the level of granularity of their ratings. Alternatively, user ratings may automatically be designated for the content as a whole or the corresponding segment during which the rating was entered. Ratings may be used to provide recommendations to other users or for such other users to evaluate whether the content item is worthwhile.

If the feedback corresponds to description or user commentary (e.g., user-entered text), the content distribution system may store the commentary in a database of user comments for the content item in step 430. As with ratings, the user commentary or description may be stored in association with a particular content segment rather than the entire content item. Optionally, the content distribution system may also parse the description or commentary to extract keywords that may be used for searching and indexing in step 435. Parsing may include removing articles, transition words and the like that are likely to be non-descriptive in nature. Remaining words may then be compared to a database of known descriptive words such as artist, actor or author names, content genres (e.g., sci-fi or adventure movies, country or pop music, etc.). The known descriptive words may then be stored as keywords in association with the content or content segment in step 440. Other methods of parsing and identifying keywords may be used to associate keywords and search terms with content items and content item segments. For example, if the commentary includes audio description or comments, methods of speech recognition and parsing may be used to convert the audio to text, store the text and identify keywords from the converted text.

Additionally or alternatively, users may identify the beginning and end points for a particular event such as a climactic scene in a movie, a scoring play in a sporting event, a scene in which an actor makes a cameo appearance, a specific news story during a newscast and the like. Using the identification of start and end times, the content distribution system may create additional content items. For example, the content distribution system may merge the segments corresponding to the start and end times and the period therebetween into a new content item (e.g., a clip of a sporting event, news story, etc.). Alternatively, instead of merging the segments into a single content item file, the segments may be copied and stored in association with one another as an item of content. In one or more arrangements, the content distribution system may also prompt the user for a description of the marked portion (e.g., one or more segments of the content item).

As described in FIG. 4, for example, users consuming content may provide commentary and helpful information to identify and label content items and segments of those content items. By doing so, the archive or database of content items may offer users more detailed searching using keywords, ratings and other user feedback. Additionally, content providers and/or content distributors may use such feedback to automatically filter or censor content. For example, if segments of a content item have been identified as inappropriate for younger audiences (e.g., rated R or higher, including nudity, profanity and/or violence) by one or more users, a content distributor, for example, may remove those segments from playback (e.g., not delivering those segments to the user and substituting appropriate segments). The labeling or identification, in some instances, may be verified prior to removal of the corresponding segments. In some arrangements, the segments might only be removed if the user is below a certain age, if the user has requested a specific version of the content, if content control settings have been set and/or combinations thereof.

In addition to allowing finer grain commenting and description of content, fragmentation further provides users the ability to transfer or continue consumption of a content item between devices. Thus, instead of viewing a video on a television, pausing at a point in the video, starting the same video again on a mobile display device and searching for the paused point, fragmentation allows users to jump to the paused point without requiring manual searching. Still further, segment-level descriptions and data may be used to generate supplemental content. In one example, a user watching a biographical film about Joe Namath may request additional content about Joe Namath's football career. In response, the content distribution system may identify and retrieve a collection of clips showing various highlights of Joe Namath's career. In particular, the content distribution system may search for content segments or clips having a description of "highlight," "touchdown," "newsworthy," "big play" or other key words and phrases relevant to identifying career highlights.

According to other aspects, user feedback on a segment by segment basis may also provide hints as to where to place commercials and other types of advertising. For example, if users consistently rate a particular segment of a radio or video program highly, an advertiser may be more inclined to place advertisements shortly before or after that segment. Content distributors and/or providers may then provide a differentiated cost scale for advertising at different times of the content program.

Figure 5:
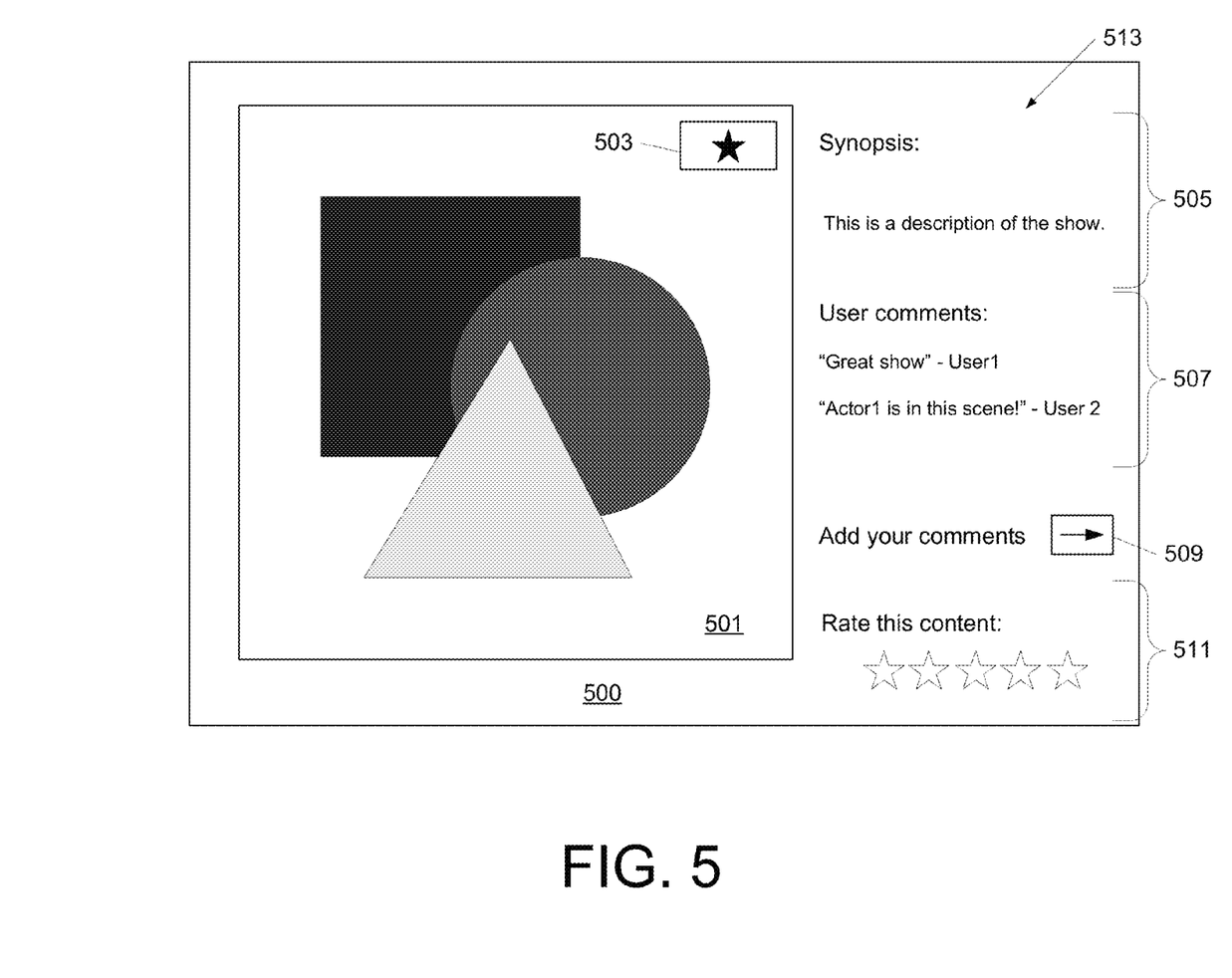
FIG. 5 illustrates an example display providing options for viewing and submitting user feedback according to one or more aspects described herein.

FIG. 5 illustrates an example user interface through which users may view previously submitted comments and add their own comments to a content item or a particular portion thereof. Screen display 500 may correspond to the display of a stationary display device such as a television or a portable display such as a mobile telecommunication device, laptop computer, pad (e.g., tablets) and the like. Screen display 500 may display content 501 simultaneously with descriptive information in region 513. For example, region 513 may include a synopsis 505 of the content 501, user comments 507 submitted for content 501, an option 509 to add user comments and an option 511 to rate the content. Comments 507 and synopsis 505 may relate directly to the scene being shown (e.g., the segment of the content item being displayed) or to the content item as a whole. Similarly, comments added using option 509 or ratings submitted using option 511 may be assigned to a segment (or more than one segment) or the entire content item. Option 503 may be included to allow user toggling between displaying and not displaying region 513. For example, region 513 may be hidden or revealed by selecting option 503.

Once content has been recorded or otherwise stored, users may access recorded content items through the content distribution system or a network archive server. In one or more arrangements, the network archive and the content distribution system may correspond to the same system. For example, a user may browse through a list of recorded content and retrieve desired content. In some instances, users might not be able to finish consuming the content at one time or may wish to consume the content using a different device (e.g., in a different location or in the same location). Accordingly, the content distribution system may further facilitate the transfer of the content between devices or between networks (e.g., a mobile device transitioning from a Wi-Fi network to a cellular network).

Figure 6:
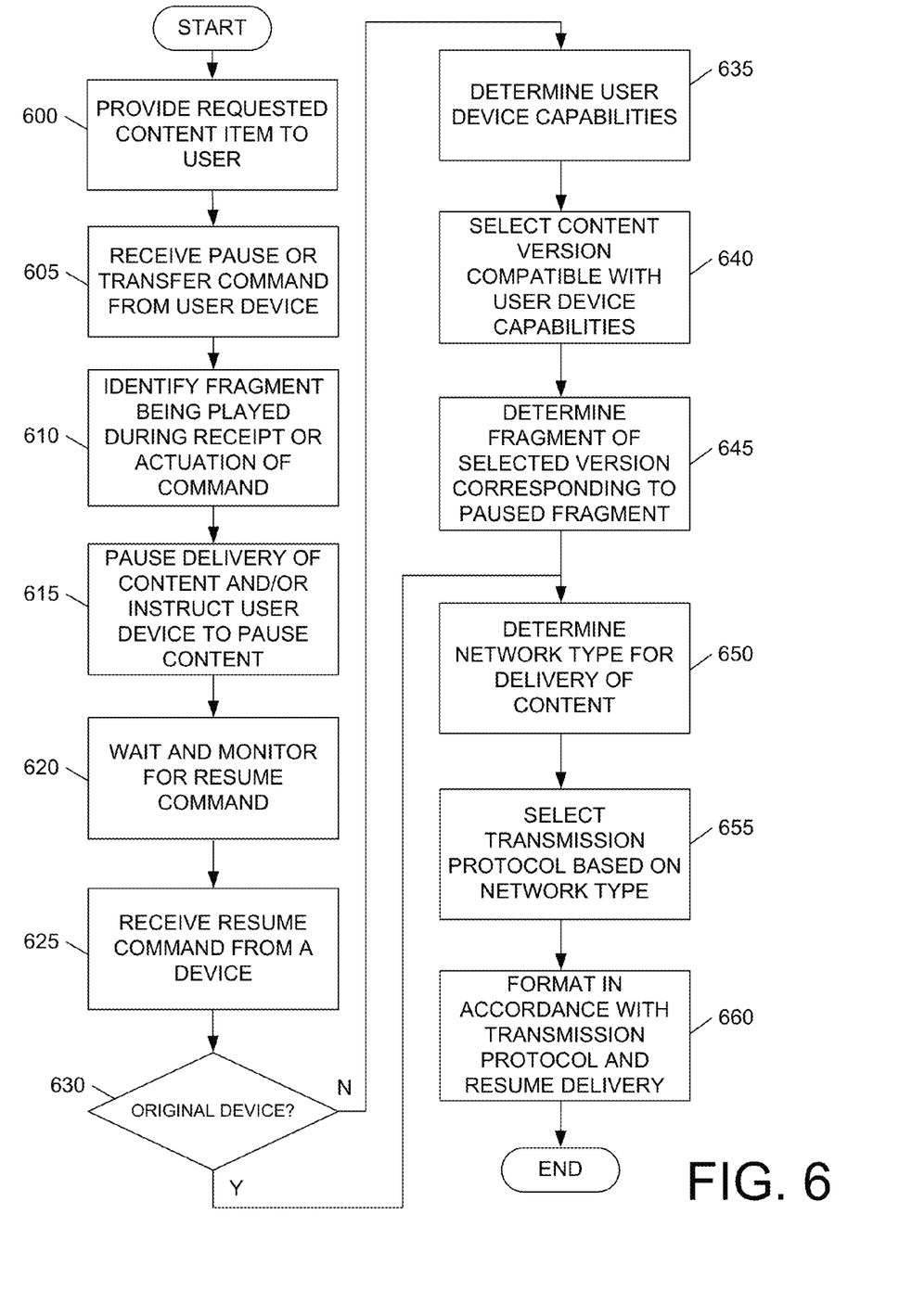
FIG. 6 is a flowchart illustrating an example method for transferring and/or resuming content playback/rendering between devices and/or networks according to one or more aspects described herein.

FIG. 6 is a flowchart illustrating an example method for transferring content consumption between two rendering devices. Initially, a content distribution system delivers a requested content item to a user through a first user device as shown in step 600. The content item may already be fragmented, for example, according to the methods and systems described herein. In other arrangements, the content item may be fragmented on the fly as the content is being delivered. In step 605, the content distribution system may receive a pause or transfer command from the first user device. Upon receipt of the pause or transfer command, the content distribution system may identify a content fragment or segment being played during receipt or actuation of the pause command in step 610. In one example, the fragment or segment may be identified by the first user device when signaling the pause or transfer command to the content distribution system. In another example, the content distribution system may identify the fragment or segment based on a most recent segment or fragment delivered to the first user device (e.g., in content streaming environments). In step 615, the content distribution system may further pause delivery of the content and, optionally instruct the first user device to pause the content (e.g., by displaying a frozen image). In some arrangements, the first user device may pause the content in response to the pause or transfer command and without instruction from the content distribution system. In step 620, the content distribution system may subsequently wait for a resume command for the paused content.

In step 625, the content distribution system may receive a command to resume the paused content. In response to the resume command, the content distribution system may identify or otherwise determine the device from which the resume command was received and the device type. and using the identification information and/or device type information, determine whether the device corresponds to the first user device or is a different, e.g., second, user device as shown in step 630. The determination of step 630 may be conducted based on device serial numbers, device addresses (e.g., IP or other network addresses), user specification, device names and the like. If the resume command is received from a device other than the first user device such as the second user device, the content distribution system may determine the second user device's capabilities in step 635. Capabilities may include screen size, screen resolution, audio playback capabilities (e.g., 6.1 versus 5.1 surround system, no speakers), device storage capacity, processor speed, RAM capacity, video codec compatibilities, audio codec compatibilities and the like. Once the device capabilities have been determined, the content distribution system may subsequently select a compatible version of the content in step 640.

Moreover, the content distribution system may determine a fragment or segment of the selected version of content that corresponds to the paused segment or fragment of the originally delivered version of the content in step 645. For example, determination or identification of the corresponding segment may include matching a running time associated with the paused segment/fragment of the content item (e.g., stored as metadata in association with the segment content file) to a segment of the selected version of the content. In another example, the corresponding segment may be identified based on a relative position of the paused segment within a set of segments making up the originally delivered content item. Thus, in a particular arrangement, if the paused segment is the $20^{th}$ segment in a set of 100 segments making up a first version of the content ($\frac{1}{5}^{th}$ of the way through the sequence of segments), a corresponding segment of a second version of the content may be identified as the $40^{th}$ segment in a set of 200 segments making up the second version (similarly $\frac{1}{5}^{th}$ of the way through the sequence of segments).

After identifying the corresponding segment or if the content distribution system receives the resume command from the same first user device, the content distribution system may proceed to determine a type of network through which content delivery is requested in step 650. In step 655, the content distribution system may select a transmission protocol in accordance with the determined network type. In step 660, the content distribution system may subsequently format the content in accordance with the transmission protocol and resume delivery of the content. If the requesting device is the same first user device, delivery of the content may resume with the originally paused version and segment of the content. If, on the other hand, the requesting device is a different, second user device, delivery may resume with the identified corresponding version and segment of the content.

Using the features, methods and systems described above with respect to at least FIG. 6, the user is thus able to easily and seamlessly transition between devices while watching the same content. For example, the user is not required to visually and manually search for the appropriate point at which the content was paused. Moreover, the user is not required to manually configure device capabilities and select compatible versions of the content based on the new device or new network through which content is to be viewed, heard, read or the like.

Figure 7:
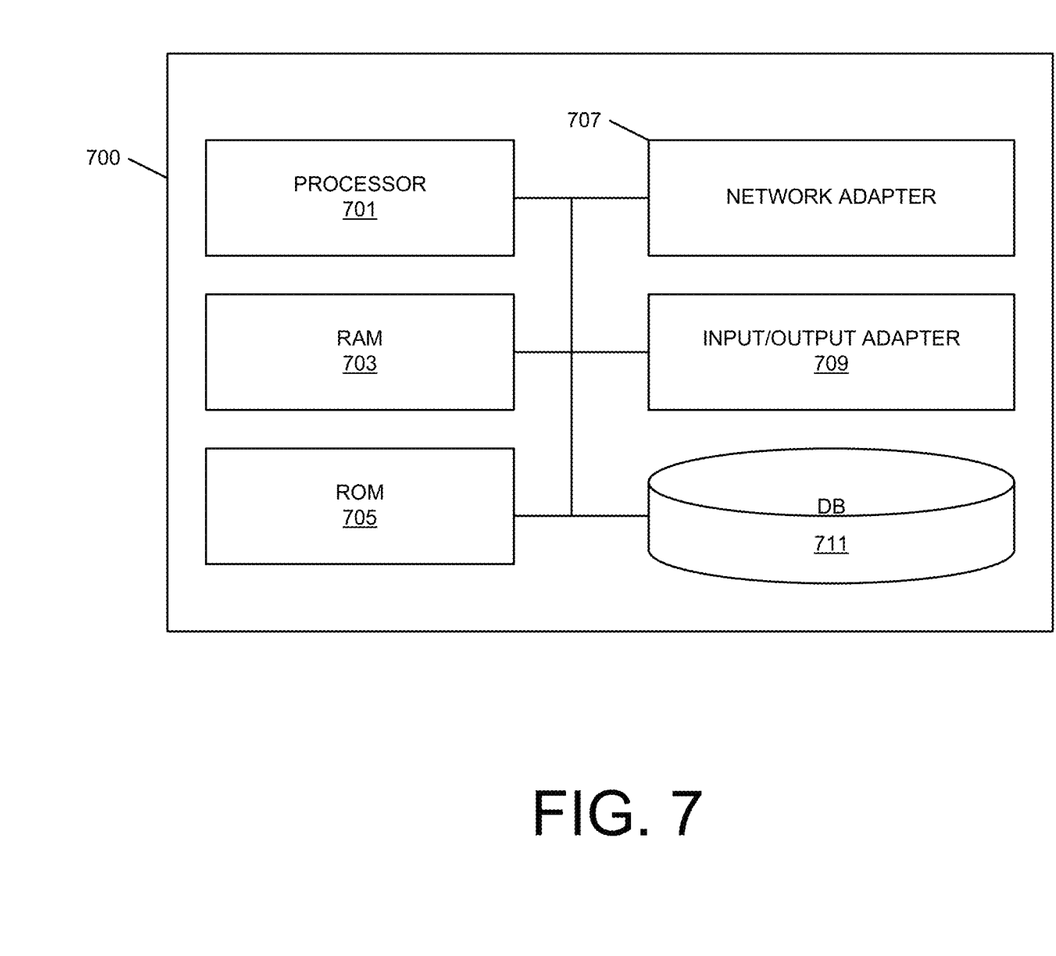
FIG. 7 illustrates an example block diagram of a computing system according to one or more aspects described herein.

The systems, devices and apparatuses described herein may include computing elements configured to process data and execute instructions. FIG. 7 illustrates a computing system 700 that may be used in a network environment such as that illustrated in FIG. 1. In one example, computing system 700 may operate as content distribution system 103 of FIG. 1. Computing system 700 may include a processor 701, random access memory (RAM) 703, read only memory (ROM) 705, network adapter 707, input/output adapter 709 and database 711. Processor 701 may operate to perform mathematical calculations and other processes to assist in the execution of computer executable instructions. RAM 703 and ROM 705 may be configured to temporarily or permanently store the computer executable instructions for retrieval and execution. Network adapter 707 may be configured to facilitate communication over various types of networks (e.g., wide-area networks, local area networks, public networks, private networks, in-home networks, etc.) with one or more other devices and/or applications (not shown). Database 711 may be configured to store instructions and data including applications, images, text, videos, audio, configuration information, setting data, user profiles, preferences and the like. In one example, database 711 may be configured to store recorded content items and content description data.

As noted above, the components and elements of computing system 700 may be used in any of the devices described herein including user devices (e.g., user premises devices, portable computing systems, etc.), content provider systems, content distributor systems, archival systems, archive servers and the like. Components of computing system 700 may be optional and may be removed or added as needed or desired.

The methods, systems and other features described herein may further be implemented through any number of computer readable media (e.g., memory) that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

Additionally or alternatively, in at least some embodiments, the methods and features recited herein may be implemented through one or more integrated circuits (ICs). An integrated circuit may, for example, be a microprocessor that accesses programming instructions or other data stored in a read only memory (ROM). In some such embodiments, the ROM stores programming instructions that cause the IC to perform operations according to one or more of the methods described herein. In at least some other embodiments, one or more of the methods described herein are hardwired into an IC. In other words, the IC is in such cases an application specific integrated circuit (ASIC) having gates and other logic dedicated to the calculations and other operations described herein. In still other embodiments, the IC may perform some operations based on execution of programming instructions read from ROM or RAM, with other operations hardwired into gates and other logic of the IC. Further, the IC may output image data to a display buffer.

Although specific examples of carrying out the invention have been described, those skilled in the art will appreciate that there are numerous variations and permutations of the above-described systems and methods that are contained within the spirit and scope of the invention as set forth in the appended claims. Additionally, numerous other embodiments, modifications and variations within the scope and spirit of the appended claims will occur to persons of ordinary skill in the art from a review of this disclosure.

We claim:

1. A method comprising:
 delivering, by a computing system, content to one or more user devices of a plurality of user devices connected to a network during a first delivery process; and
 storing, by the computing system while delivering the content during the first delivery process, a copy of the content to a storage device, wherein the storage device and the computing system are located remotely from the one or more user devices of the plurality of user devices, wherein the storing is performed irrespective of any interaction with or input received from any of the plurality of user devices,
 wherein the storing of the copy of the content is separate from the first delivery process, and comprises:
  fragmenting the content into a plurality of segments, each segment being of a predefined size; and
  storing, as the copy of the content, each of the plurality of segments as a separate content segment file.

2. The method of claim 1, wherein storing the copy of the content to the storage device further comprises:
 retrieving supplemental information comprising content attribute information from a source other than the content; and
 storing the content attribute information in association with the copy of the content.

3. The method of claim 2, wherein the content is received from a content source and the content attribute information is retrieved from an electronic programming guide, the method further comprising:
 receiving, by the computing system, a request for the stored copy of the content after the first delivery process;
 identifying the stored copy of the content in the storage device based on the retrieved content attribute information; and
 delivering the stored copy of the content to a requesting device in a second delivery process.

4. The method of claim 1, wherein storing the copy of the content to the storage device further comprises storing each of the plurality of segments as individually user-retrievable content items in the storage device.

5. The method of claim 1, further comprising:
 receiving, by the computing system during or after the first delivery process, user identification of a start time and an end time of an event in the content from the one or more user devices, the event being less than an entirety of the content;
 receiving, by the computing system, information describing the event;
 identifying one or more of the plurality of segments of the content corresponding to a period of time between the user-identified start time and the user-identified end time of the event; and
 storing the information describing the event in association with the identified one or more plurality of segments corresponding to the period of time between the user-identified start and end times.

6. The method of claim 1, further comprising identifying, from one or more external content repositories, at least a portion of the content using one or more time codes specified in a content segment file.

7. The method of claim 1, further comprising scheduling retrieval availability of the stored copy of the content to one or more users during a second delivery process for a future date and time, wherein the future date and time is defined based on an amount of time from storing the copy of the content to the storage device.

8. The method of claim 1, further comprising:
 receiving, during the first delivery process, user feedback relating to the content;
 identifying a segment of the plurality of segments corresponding to a time at which the user feedback was received; and
 storing the user feedback in association with the identified segment.

9. The method of claim 1, further comprising:
 storing, in the storage device, a first version of the copy of the content and a second version of the copy of the content, wherein the first version is different from the second version; and
 storing, in the storage device, a reference between a segment of the first version of the copy of the content and a corresponding one or more segments of the second version of the copy of the content.

10. The method of claim 9, wherein the first version corresponds to a first video quality and the second version corresponds to a second video quality,
 wherein the segment of the first version corresponds to a plurality of segments of the second version, and
 wherein the reference links the segment of the first version to the corresponding plurality of segments of the second version.

11. An apparatus comprising:
 at least one processor; and
 memory coupled to the at least one processor and storing computer readable instructions that, when executed, cause the apparatus to:
  deliver content to one or more user devices of a plurality of user devices connected to a network during a delivery process; and
  store, during the delivery process, a copy of the content to a storage device, wherein the storage device and the apparatus are located remotely from one or more user devices of the plurality of user devices, wherein the storing is performed irrespective of any interaction with or input received from any of the plurality of user devices, wherein storing the copy of the content is separate from the delivery process and comprises:
   fragmenting the content into a plurality of segments, each of the segments being of a predefined size; and
   storing, as the copy of the content, each of the plurality of segments as a separate content segment file.

12. The apparatus of claim 11, wherein storing the copy of the content to the storage device further comprises:
 retrieving content attribute information; and
 storing the content attribute information in association with the copy of the content.

13. The apparatus of claim 12, wherein the computer readable instructions, when executed, further cause the apparatus to:

receiving a request for the stored copy of the content;
identifying the stored copy of the content in the storage device based on the content attribute information; and
delivering the stored copy of the content to a requesting device.

14. The apparatus of claim 11, wherein storing the copy of the content to the storage device further comprises storing each of the plurality of segments as individually retrievable content items in the storage device.

15. The apparatus of claim 11, wherein the computer readable instructions, when executed, further cause the apparatus to:
   receive, during or after the delivery process, user identification of a start time and an end time of an event in the content from the one or more user devices, the event being less than an entirety of the content;
   receive information describing the event;
   identify one or more of the plurality of segments of the content corresponding to a period of time between the user-identified start time and the user-identified end time; and
   store the information describing the event in association with the identified one or more plurality of segments corresponding to the period of time between the user-identified start and end times.

16. The apparatus of claim 15, wherein receiving the information describing the event further comprises receiving user specified data.

\* \* \* \* \*